Dec. 17, 1935.    L. J. SCHLITZER    2,024,604
EYEBALL FOR DOLLS
Filed Sept. 18, 1933
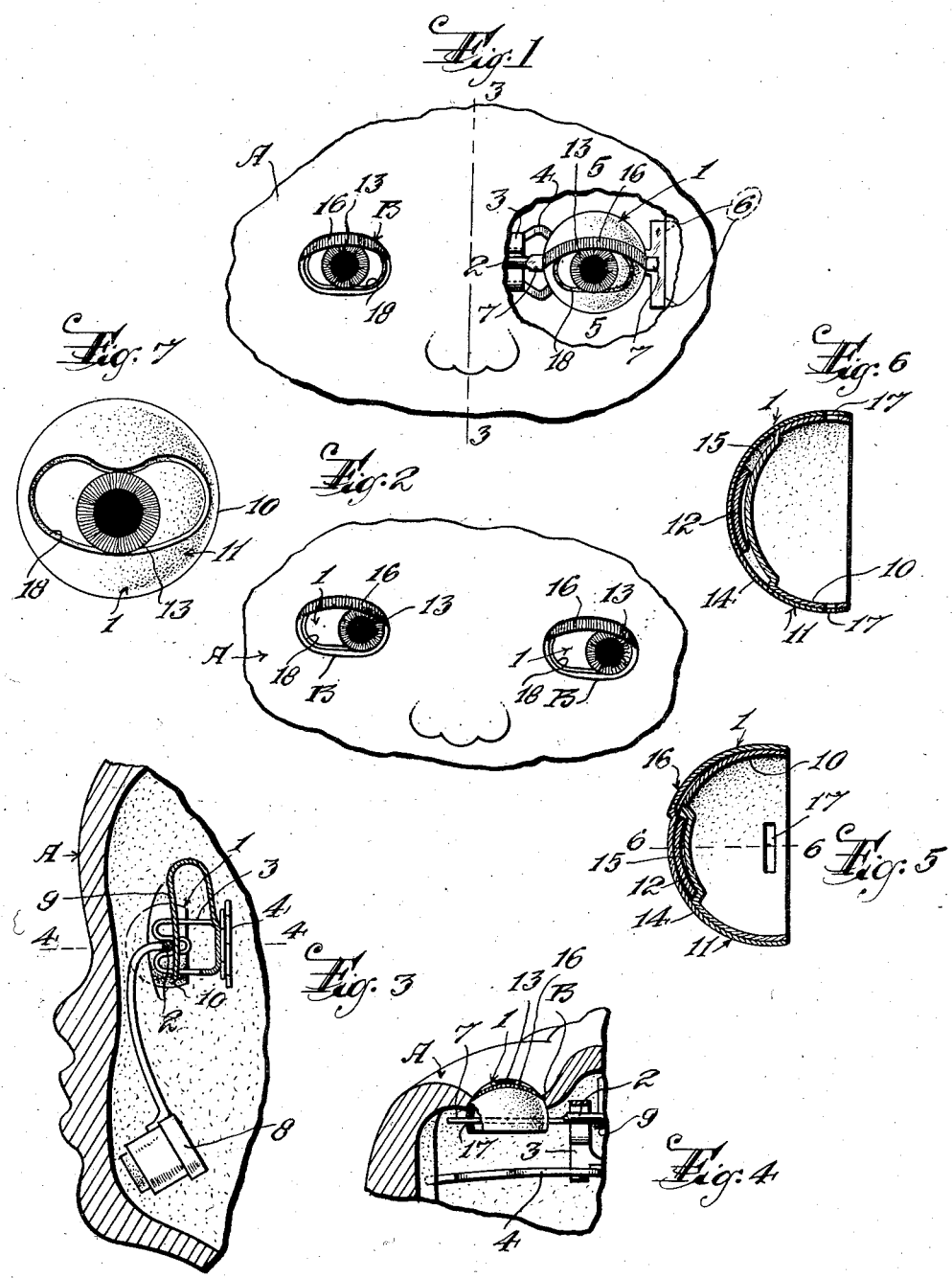
INVENTOR
Leo J. Schlitzer
BY Harry A. Cook
ATTORNEY Patented Dec. 17, 1935

2,024,604

UNITED STATES PATENT OFFICE 2,024,604

EYEBALL FOR DOLLS

Leo J. Schlitzer, New York, N. Y., assignor of one-third to Joseph A. Taferner, New York, N. Y., and one-third to Nicholas Popovich, Teaneck, N. J.

Application September 18, 1933, Serial No. 689,898

2 Claims. (Cl. 46—163)

This invention relates in general to eye sets for dolls and artificial figures, including eye members which are mounted within the head of a doll or the like to rotate in eye openings or sockets and simulate natural movement of the eyes as in opening and closing thereof. More particularly the invention relates to eye sets of this character which are also capable of simulating lateral or sidewise movement of the eyeballs.

One object of the invention is to provide a novel and improved unitary eye member or eyeball which can be mounted to oscillate or rotate in an eye opening in a doll head under influence of a gravity operated pendulous mechanism to simulate opening and closing of the eye and shall also be capable of simulating the anatomical lateral or sidewise movement of an eyeball by simple gravitational action directly on the eyeball and without the necessity for special or additional operating mechanism, whereby the eyeball shall be simple and inexpensive in construction and reliable and durable in operation.

Another object is to provide such an eyeball which shall comprise a body having a spherical surface to simulate an eyeball and a peripheral groove or recess in said surface, a part movable by gravity in said groove and constituting a representation of the pupil and iris of an eye, and means for retaining said part in said groove, whereby upon tilting of said eyeball or the doll head in which the eyeball is mounted, said part will move in said recess peripherally of said spherical surface to simulate lateral or sidewise movement of the pupil and iris of an eye.

Other objects are to provide such an eyeball wherein said part representing a pupil and iris shall be retained in said groove by a transparent shell applied over said spherical surface of said body and closing the groove; to provide an eyeball of the character described wherein said transparent shell shall have a representation of eyelashes in proper relation to said part representing a pupil and iris; and to obtain other advantages and results as will be brought out by the following description.

Referring to the accompanying drawing in which corresponding and like parts are designated throughout the several views by the same reference characters, Figure 1 is a fragmentary front elevation of the face of a doll, showing an eye mounting embodying my invention, portions of the face being broken away for clearness in illustration.

Figure 2 is a similar view showing the face tilted so as to cause the pupil and iris parts of the eye members to move laterally or sidewise with respect to the face or longitudinally of the eye openings.

Figure 3 is a transverse vertical sectional view on the line 3—3 of Figure 1.

Figure 4 is a fragmentary horizontal sectional view on the line 4—4 of Figure 3.

Figure 5 is an enlarged detached transverse sectional view through one of the eye members, on the line 5—5 of Figure 1.

Figure 6 is a horizontal sectional view through the eye member on the line 6—6 of Figure 5, and Figure 7 is a front elevation of an eye member showing a modification of the invention.

An eye member embodying my invention may be utilized with many different types of eye mounting mechanisms, and may even be used without any particular mounting mechanism by simply securing the eye member in an eye socket. However, for the purposes of illustration I have shown the eye member in connection with the mounting mechanism such as described and claimed in the copending application Serial No. 672,116, of Nicholas Popovich. Specifically describing the illustrated embodiment of the invention, the reference character A designates the face portion of a doll head of known construction which is formed of penetrable material and has the usual eye openings B. In each of the eye openings is arranged an eye member 1 mounted to rotate to simulate opening and closing of the eyes, these eye members being mounted on a yoke member or rod 2 which is in turn pivotally mounted in a bracket 3 which is secured on a supporting member or bar 4 which has prongs 6 at its ends to penetrate the material of the doll head for securing the bar in position.

The yoke member 2 is shown in the form of a rod having flattened or polygonal end portions 7 to be connected to the eye members 1, and the yoke member has the usual pendulous weight 8 for rotating the yoke member under action of gravity as the doll head is tilted forwardly or backwardly to cause rotation of the eye members to simulate opening and closing of the eyes.

The eye members are yieldingly held in the eye openings B by a spring tongue 9 on the bracket 3 which normally influences the yoke member toward the face of the doll as clearly shown in Figure 3.

Each eye member is shown as comprising a body 10 constituting a substantially hemispherical hollow shell which has a spherical surface 11 to simulate an eyeball, this surface being preferably colored white. A part, shown in the form of a circular disc 12, and bearing the representation 13 of a pupil and iris, is mounted to move peripherally of the exterior spherical surface of the body 10; and as shown, this part 12 is located between the spherical surface of the body and a hollow substantially hemispherical transparent shell 14 which snugly overlies the spherical surface 11 of the body. This shell 14 may be formed of any suitable material, for example celluloid.

For guiding the movement of the pupil and iris part 12, the spherical surface 11 of the body is provided with an elongated peripheral groove or recess 15 along the edges of which the part 12 may roll upon tilting of the body of the eye member. The bottom of the groove 15 is longitudinally and transversely curved to approximate the curvature of the spherical surface 11, and preferably the pupil and iris part 12 is concavo convex and of a radius slightly less than that of the radius of curvature of the bottom of the groove, to reduce the area of the surface contact between the part 12 and the body 10 so as to obviate unnecessary frictional engagement of the two parts and ensure free and easy movement of the part 12 in the groove. The groove 15 is of such depth that the outer convex surface of the disc 12 is approximately flush with the surface of the eyeball so as to realistically simulate the natural eye.

Preferably, the shell 14 has the representation 16 of an eyelid and eyelash, said representation partially overlying the groove 15 as shown in Figures 1 and 5 to provide a realistic appearance and also to conceal the edge of the groove.

The eye member is formed with diametrically opposite slots 17 to slidably receive the end portions 7 of the yoke member 2 so that the eye members will be supported by the yoke members and will be rotated thereby.

The eye mounting is located in a doll head with an eye member in each opening B so that rotation of the yoke member 2 under influence of the pendulum 8 will cause rotation of the eye members to move the pupil and iris parts 12 transversely of the eye openings to simulate opening and closing of the eye. The grooves 15 of the eye members extend longitudinally of the eye openings so that upon tilting of the doll head sidewise, the pupil and iris parts 12 will roll by gravitational action toward the ends of the grooves longitudinally of the eye openings so as to simulate lateral or sidewise movement of an eyeball, as shown in Figure 2.

A modification of the invention is shown in Figure 7 where the longitudinal side walls of the groove are curved as indicated at 18 so that when the doll head is upright, action of gravity on the pupil and iris parts 12 will cause them to roll to the middle of the grooves and face directly forwardly from the eye openings as shown in Figure 7. When the eye members or the doll head are tilted from one side to the other the pupil and iris parts are rolled along the curved edge toward one end of the groove just as in the construction shown in Figures 1 to 6 inclusive.

From the foregoing it will be observed that my eye member constitutes a unit or is a unitary structure capable of being mounted in a doll head to simulate both opening and closing of the eyes and lateral or sidewise movement of an eyeball. The lateral or sidewise movement of the pupil is accomplished by simple action of gravity directly on the pupil and iris part and without necessity for special and additional actuating mechanism.

I am aware that a movable pupil and iris part in eye members is not broadly new; for example such a structure is broadly suggested in Patents Numbers 1,718,346 dated June 25, 1929 and 1,535,796 dated April 29, 1925, and therefore I do not desire to be understood as attempting to claim such structures. However, none of the prior art eye members known to me constitute unitary structures which can be used both to simulate opening and closing of the eyes and lateral and sidewise movement of an eyeball. It will be understood that the specific form of the invention illustrated and described is representative of the principles of my invention and that the invention may be embodied in other and modified details of construction without departing from the spirit or scope of the invention.

Having thus described my invention, what I claim is:

1. In an artificial eye for dolls, an eyeball member having a hemispherical surface a transparent hemispherical shell member overlying said surface, a circular part simulating an iris and pupil interposed between said members and bodily movable therebetween said part having inner and outer faces of greater curvature than said members to reduce frictional contact therewith, and means for guiding bodily movement of said part.

2. In an artificial eye for dolls, an eyeball member having a hemispherical surface with a peripheral groove therein longitudinally and transversely curved to approximate the curvature of said hemispherical surface, and a circular concavo-convex part simulating an iris and pupil mounted in said groove and capable of rolling along the edges thereof, said circular part having a convex outer surface of slightly less radius than said hemispherical surface and said groove being of a depth so that the convex surface of the circular part is approximately flush with said hemispherical surface.

LEO J. SCHLITZER.